United States Patent Office 3,359,063
Patented Dec. 19, 1967

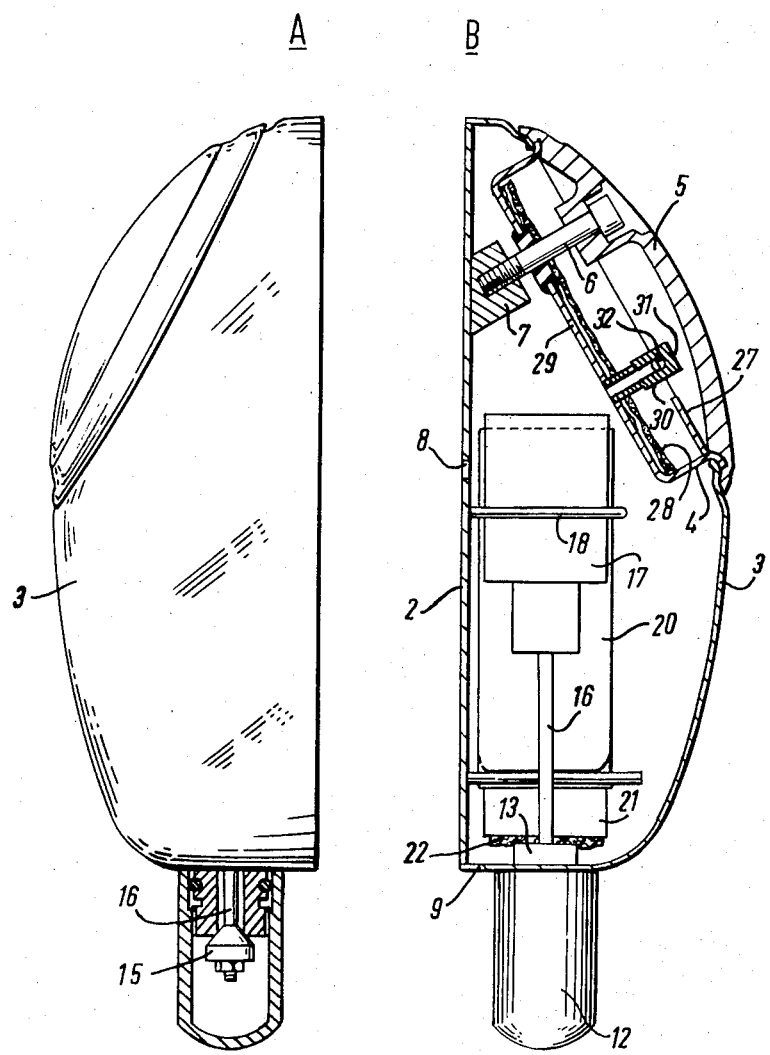

3,359,063
MAINTENANCE OF URINALS, WATER CLOSET BASINS AND THE LIKE
Edward Maude, Nantwich, England, assignor to Calmic Limited, Crewe, England, a British company
Filed May 20, 1964, Ser. No. 368,867
Claims priority, application Great Britain, May 28, 1963, 21,196/63
9 Claims. (Cl. 21—58)

ABSTRACT OF THE DISCLOSURE

The invention provides a method of maintaining flushed urinals and water closet basins in a sanitary condition. A viscous slowly mobile disinfectant composition preferably containing up to about 50% quarternary ammonium compound is diffused through a porous plug into a small quantity of still water to form a concentrated aqueous disinfectant solution during an interval between flushes. The concentrated solution is diluted during a flush and the diluted solution is discharged into the convenience at the end of the flush so that comparatively little disinfectant is wasted.

---

Figure 1:
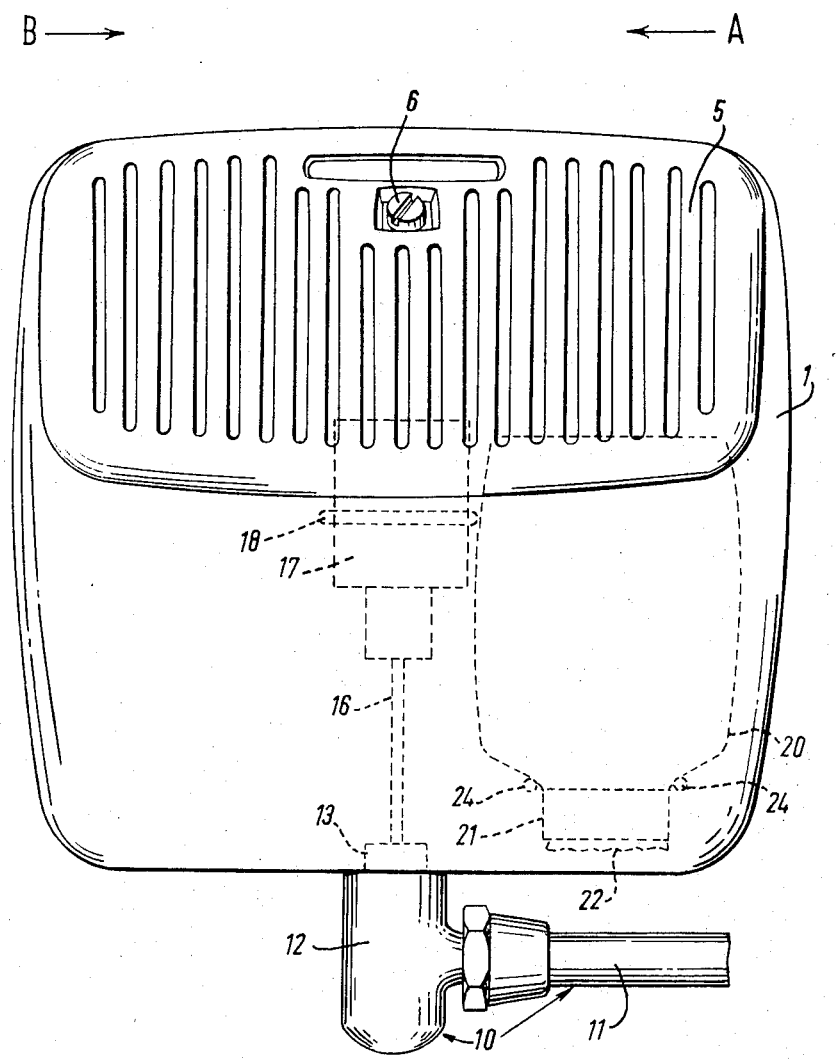

The present invention relates to the maintenance of urinals, water closet basins and the like flushed conveniences (hereinafter collectively referred to as conveniences or flushed conveniences) in a relatively clean, odor-free and sanitary condition.

The present invention resides in forming, during an interval between flushes, a relatively concentrated aqueous disinfectant solution from a viscous slowly mobile disinfectant composition, for example a paste, emulsion or jelly, diluting the concentrated solution during a flush and discharging the diluted solution into the convenience at the end of the flush.

In a preferred mode of carrying the invention into effect the relatively concentrated aqueous solution is formed by holding the disinfectant composition in contact with one face of a layer, wad, or plug of reticulate of foraminous material, for example sponge, the opposite face of which is in contact with a relatively small quantity of still water.

The viscosity of the disinfectant composition should be sufficient to enable it to be retained by a reticulate or foraminous layer, wad or plug, for example sponge, therebeneath but its mobility should be sufficient to enable it to remain in contact with said layer, wad or plug during consumption thereof in the formation of the concentrated solution.

Delivery of the diluted disinfectant solution to the convenience at the end of a flush tends to avoid wastage and leaves the surface of the convenience wetted with the solution so as to enable it to exert its disinfectant action thereon for a much longer period of time than would be the case if it were delivered with the flush.

The disinfectant composition may incorporate a bactericide and a detergent, one of which is preferably in solid form. A suitable composition may contain about 50% by weight of a quaternary ammonium compound preferably in a solid state dispersed in a liquid detergent which is compatible with the quaternary ammonium compound and which is present in a concentration of about 35% to 40%. The dispersion may be diluted with a liquid agent such as propylene glycol to afford thereto an appropriate degree of viscosity. Suitable compositions can also be formulated when both detergent and bactericide are in liquid form. With such formulations it will usually be necessary to include a water soluble thickening agent, filler or the like to afford thereto an appropriate balance between mobility and viscosity.

In practice the said relatively concentrated aqueous solution may contain approximately 2% of the quaternary ammonium compound and the diluted solution discharged into the convenience at the end of a flush may contain from 2 to 15 parts of the quaternary ammonium compound per million. When delivered in these concentrations the bactericidal quaternary can destroy or inhibit the growth of bacteria which give rise to decomposition of urates and to the malodor experienced in conveniences. The incorporation of a detergent supplements the wetting effect of the quaternary and so prevents or minimises the formation of incrustation frequently found in conveniences where bactericidal decomposition takes place.

The present invention includes the possibility of using bactericides other than quaternary ammonium compounds for example phenolic derivatives such as chlorcresols, hexachlorophene, hexylresorcinol and similar substances, which are capable of inhibiting the growth of urea-splitting organisms in relatively extreme dilutions.

A device according to the present invention comprises an outer container having a pipe connection leading from its base for feeding water to the outer container from a flushing system during a flush and for returning it to the flushing system at the end of the flush; an inner container for a viscous slowly mobile disinfectant composition open at its lower end which is spaced above the base of the outer container and which is closed by a layer, wad or plug of reticulate or foraminous material for example sponge on the upper face of which the disinfectant composition can rest and a baffle or weir between the inner container and said connection adapted to retain a sufficient depth of water beneath the inner container to keep the retained water in contact with or to submerge the lower face of the sponge.

The said baffle or weir may comprise a projection of said pipe connection into and above the base of the outer container.

The inner container may comprise an inverted bottle with a sponge plug inserted in the neck of the bottle.

Figure 4:
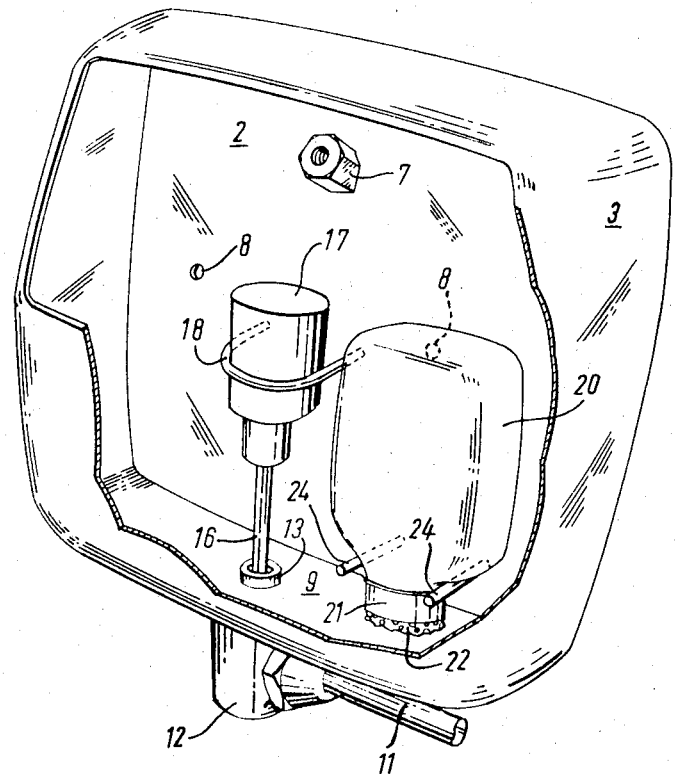

The said outer container may be arranged to provide accommodation for a supply of deodorant, such for example as a deodorant pad, from which a deodorant draught may be caused to emerge as a result of a displacement of air from the container by the ingress of water thereto through said pipe connection during a flush The invention is further described by way of example with reference to the accompanying drawings which illustrate one form of device according to the present invention and in which:

FIG. 1 is a front view;
FIG. 2 is a part sectional side view looking in the direction of the arrow A of FIG. 1;
FIG. 3 is a part sectional side view looking in the direction of the arrow B of FIG. 1;
FIG. 4 is a perspective view corresponding to FIG. 1 with part of the outer container broken away to reveal the interior.

The outer container 1 comprises a backplate 2 sealingly secured to a dished front plate 3 (FIG. 3). Near its upper end the front plate 3 has formed therein a more or less rectangular opening in which is received a deodorant compartment 4. The compartment 4 is closed externally by a grille 5. The compartment 4 and grille 5 are secured in position by a screw 6 which engages in a threaded socket 7 on the inner face of the backplate 2. The backplate 2 has two openings 8 therein to enable it to be secured to a supporting surface such as a wall.

A pipe connection generally referenced 10 is secured to the base 9 of the outer container 1. A pipe 11 of the pipe connection 10 leads to a flush pipe. The pipe connection 10 includes a valve housing 12 having a spigot 13 which projects into the outer container 1 to a level above the level of the base 9. A valve 15 (FIG. 2) in the valve housing 12 has a valve stem 16 connected at its upper end to a float 17. The float 17 is guided by a wire stirrup 18 secured to the backplate 2. The float 17 comprises a sealed hollow container which may be of metal or plastic material.

Inner container 20 comprises a bottle formed of plastic material having a neck 21 with a sponge plug 22 inserted therein. The bottle is shouldered at opposite sides of the neck 21 and is supported at the shoulders by parallel horizontal rods 24 which extend forwardly from the backplate 2.

The deodorant compartment 4 has a transversely extending upward lip 27 for the retention therein of a supply of liquid deodorant. A pad 28 rests on the back 29 of compartment 4 and extends below the level of the upper edge of the lip 27 to enable it to dip into the deodorant liquid contained in the compartment 4. A tube 30 is secured to the back 29 of compartment 4 and communicates at its inner end with the interior of the container 1. Its outer end 31 is closed but near its outer end it is formed with opposite horizontally directed holes 32.

When a flush occurs down the flush pipe to which pipe 11 is connected flush water will enter and rise in outer container 1 and at the end of the flush will drain therefrom to the convenience that the flush pipe serves. Float 17 and valve 15 are arranged to prevent the water from rising too far.

The ingress of water into the container 1 will cause air to be ejected through tube 30 and through holes 32 therein to give rise to a deodorant draught through the grille 5.

At the end of a flush a small quantity of water will be retained in the bottom of the outer container 1 by the spigot 13 serving as a weir or barrier. The level of the bottle 20 in relation to the upper end of the spigot 13 is such that the lower face of the sponge 22 is at least in contact with and preferably slightly submerged in the water retained by the spigot 13. A viscous slowly mobile disinfectant composition is contained in the bottle 20 and permeates the sponge 22 so that between suitably spaced flushes a relatively concentrated aqueous disinfectant solution is formed in the bottom of the outer container 1. When the next flush occurs the concentrated solution is diluted by flush water entering the outer container through pipe connection 10 and the diluted solution is discharged through the pipe connection 10 at the end of the flush.

The baffle or weir provided by the spigot 13 may be replaced by a low wall running across the outer container from back to front at a position between the valve housing 12 and the inner container 20.

I claim:

1. A method of maintaining flushed conveniences such as urinals and water closet basins in a relatively clean, odor-free and sanitary condition which comprises forming, during an interval between flushes, a relatively concentrated aqueous disinfectant solution by holding a viscous, slowly mobile disinfectant composition in contact with one face of a wad of foraminous material, the opposite face of which is in contact with a relatively small quantity of still water, diluting the concentrated solution during a flush and discharging the diluted solution into the convenience at the end of the flush.

2. A method according to claim 1 in which the disinfectant composition incorporates a bactericide and a detergent, one of which is in solid form.

3. A method according to claim 2 in which the disinfectant composition contains about 50% by weight of a quaternary ammonium compound in a solid state dispersed in a liquid detergent which is compatible with the quaternary ammonium compound and which is present in a concentration of about 35 to 40%.

4. A method according to claim 3 in which the dispersion is diluted with a liquid agent to afford thereto an appropriate degree of viscosity.

5. A method according to claim 4 in which the liquid agent is propylene glycol.

6. A method according to claim 3 in which the diluted solution discharged into the convenience at the end of a flush contains from 2 to 15 parts of quaternary ammonium compound per million.

7. A method according to claim 1 in which the disinfectant composition comprises a liquid detergent and a liquid bactericide.

8. A method according to claim 7 in which the composition includes a thickening agent to afford thereto an appropriate balance between mobility and viscosity.

9. A method according to claim 1 in which the disinfectant composition incorporates a bactericide comprising a phenolic derivative capable of inhibiting the growth of urea splitting organisms in relatively extreme dilutions.

References Cited

UNITED STATES PATENTS

| 1,170,387 | 2/1916 | M. V. Andrews. |
| 1,623,132 | 4/1927 | R. H. L. Pennell et al. |
| 2,998,380 | 8/1961 | William F. Hamilton _ 21—58 X |

OTHER REFERENCES

C. A. Lawrence; Surface-Active Quaternary Ammonium Germicides; Academic Press, N.Y., 1950 (p. 68).

A. M. Schwartz et al.; Surface Active Agents and Detergents; vol. II, Interscience, N.Y., 1958 (pp. 235, 236, and 283).

MORRIS O. WOLK, *Primary Examiner.*

B. S. RICHMAN, *Assistant Examiner.*